United States Patent

Nakamura

(10) Patent No.: US 6,751,523 B2
(45) Date of Patent: Jun. 15, 2004

(54) NC MACHINING SIMULATION APPARATUS

(75) Inventor: Takayuki Nakamura, Yamatokoriyama (JP)

(73) Assignees: Mori Seiki Co., Ltd., Yamatokoriyama (JP); Intelligent Manufacturing Systems International, Sacramento, CA (US)

(*) Notice: Subject to any disclaimer, the term of this patent is extended or adjusted under 35 U.S.C. 154(b) by 467 days.

(21) Appl. No.: 09/942,658

(22) Filed: Aug. 31, 2001

(65) Prior Publication Data

US 2002/0045968 A1 Apr. 18, 2002

(30) Foreign Application Priority Data

Sep. 5, 2000 (JP) ........................... 2000-269322

(51) Int. Cl.[7] .............................................. G06F 19/00
(52) U.S. Cl. ..................... 700/182; 700/180; 318/567
(58) Field of Search ................... 700/159, 180, 700/182, 183, 184, 83; 318/567, 568.1, 568.23, 568.25, 569

(56) References Cited

U.S. PATENT DOCUMENTS

| 5,315,523 A | * | 5/1994 | Fujita et al. | 700/180 |
| 5,337,249 A | * | 8/1994 | Fujita et al. | 700/180 |
| 5,561,601 A | * | 10/1996 | Inoue et al. | 700/182 |
| 5,610,842 A | * | 3/1997 | Seki et al. | 345/473 |
| 5,808,432 A | * | 9/1998 | Inoue et al. | 318/561 |
| 6,445,964 B1 | * | 9/2002 | White et al. | 700/61 |
| 6,662,073 B1 | * | 12/2003 | Fujishima et al. | 700/173 |

FOREIGN PATENT DOCUMENTS

| JP | 10-105220 | 4/1998 |
| JP | 10-124124 | 5/1998 |
| JP | 11-045106 | 2/1999 |

* cited by examiner

*Primary Examiner*—Leo Picard
*Assistant Examiner*—Zoila Cabrera
(74) *Attorney, Agent, or Firm*—Westerman, Hattori, Daniels & Adrian, LLP

(57) ABSTRACT

The present invention relates to a more convenient machining simulation apparatus for simulating a machining operation in accordance with an NC program. The machining simulation apparatus is adapted to display the configuration of a tool and the configuration of a workpiece on a display device (31) and change the tool configuration and the workpiece configuration on the display device (31) in accordance with the NC program so as to check the movement and machining state of the tool on the display device (31). The apparatus includes a process image data storage section (27) for storing therein pixel data generated at the end of a machining process precedent to the designated machining process from the process image data storage section (27) to display the tool configuration and the workpiece configuration on the display device (31) and successively re-generates pixel data to display the tool configuration and the workpiece configuration on the display device (31).

4 Claims, 9 Drawing Sheets

NC MACHINING SIMULATION APPARATUS

BACKGROUND OF THE INVENTION

1. Field of the Invention

The present invention relates to an NC machining simulation apparatus for simulating a machining operation according to an NC program including consecutive machining processes each constituted by one or more execution blocks by displaying the configuration of a tool and the configuration of a workpiece on a display device and successively changing the tool configuration and the workpiece configuration on the display device in accordance with the NC program so as to check the movement and machining state of the tool on the display device.

2. Description of the Prior Art

The operation of an NC machine tool is generally controlled in accordance with an NC program. Conventionally, the NC program is created manually by a programmer or by means of an automatic programming apparatus. In either case, it is necessary to check if tool paths and machining conditions are properly defined by the NC program thus created before a machining operation is performed with the use of the NC program.

Conventionally known as an apparatus for performing the aforesaid checking operation is an NC machining simulation apparatus for simulating a machining operation according to an NC program including consecutive machining processes each constituted by one or more execution blocks by displaying the configuration of a tool and the configuration of a workpiece on a display device and successively changing the tool configuration and the workpiece configuration on the display device in accordance with the NC program to check the movement and machining state of the tool on the display device.

The NC machining simulation apparatus analyzes each of the execution blocks of the NC program. Then, the apparatus successively generates pixel data indicative of the tool configuration and the workpiece configuration for the respective blocks on the basis of preliminarily inputted tool configuration data and workpiece configuration data, and displays the tool configuration and the workpiece configuration on the display device on the basis of the pixel data thus generated.

However, the conventional NC machining simulation apparatus simulates the machining operation by analyzing the NC program from the first execution block thereof. Therefore, it is impossible to start the machining simulation from an intermediate execution block of the NC program.

Where the simulation indicates a need for modification of an execution block of the NC program and the block is modified, for example, the machining simulation should be performed again for the modified block and blocks subsequent thereto to check if the NC program properly works. However, the conventional NC machining simulation apparatus cannot start the simulation from the modified block but from the first block of the NC program, requiring much time for checking the NC program after the modification.

Where a machining state simulated according to an intended execution block of the NC program cannot satisfactorily be checked during the machining simulation, it is convenient to retrospectively check the machining state. Since the conventional NC machining simulation apparatus always starts the simulation from the first block of the NC program as described above, it is inconvenient to re-check the machining state simulated according to the intended execution block by performing the simulation again from the start.

In view of the foregoing, it is an object of the present invention to provide a more convenient machining simulation apparatus which can start the machining simulation from an intermediate execution block of an NC program or retrospectively check a machining state simulated according to a precedent execution block of the NC program.

SUMMARY OF THE INVENTION

In accordance with the present invention to achieve the aforesaid object, there is provided an NC machining simulation apparatus for simulating a machining operation in accordance with an NC program including consecutive machining processes each constituted by one or more execution blocks by displaying the configuration of a tool and the configuration of a workpiece on a display device and successively changing the tool configuration and the workpiece configuration on the display device in accordance with the NC program so as to check the movement and machining state of the tool on the display device, the apparatus comprising: a tool data storage section storing therein tool configuration data; a workpiece configuration data storage section storing therein workpiece configuration data; an NC program storage section storing therein the NC program; an image data generating section which successively analyzes the respective execution blocks of the NC program and successively generates pixel data indicative of the tool configuration and the workpiece configuration for the respective execution blocks on the basis of the tool configuration data stored in the tool data storage section and the workpiece configuration data stored in the workpiece configuration data storage section; a graphic section which displays the tool configuration and the workpiece configuration on the display device on the basis of the pixel data generated by the image data generating section; and a process image data storage section for storing therein pixel data generated at the end of each of the machining processes by the image data generating section; wherein the image data generating section, in response to designation of a machining process externally inputted thereto, reads pixel data generated at the end of a machining process precedent to the designated machining process from the process image data storage section to cause the graphic section to display the tool configuration and the workpiece configuration on the display device on the basis of the read pixel data, and successively regenerates pixel data for the designated machining process and machining processes subsequent thereto to cause the graphic section to display the tool configuration and the workpiece configuration on the display device on the basis of the re-generated pixel data.

In the present invention, the image data generating section successively analyzes the respective execution blocks of the NC program stored in the NC program storage section, and successively generates pixel data indicative of the tool configuration and the workpiece configuration for the respective execution blocks on the basis of the tool configuration data stored in the tool data storage section and the workpiece configuration data stored in the workpiece configuration data storage section. Then, the graphic section displays the tool configuration and the workpiece configuration on the display device on the basis of the pixel data generated by the image data generating section. Further, pixel data generated at the end of each of the machining processes by the image data generating section is stored in the process image data storage section.

When a signal for designation of a specific machining process is externally inputted to the image data generating section, the image data generating section reads pixel data generated at the end of a machining process precedent to the designated machining process from the process image data storage section to cause the graphic section to display the tool configuration and the workpiece configuration on the display device on the basis of the read pixel data. Further, the image data generating section successively analyzes the designated machining process and machining processes subsequent thereto, and successively regenerates pixel data for these machining processes to cause the graphic section to display the tool configuration and the workpiece configuration on the display device on the basis of the re-generated pixel data.

With this arrangement, the machining simulation can be restarted from an intermediate machining process (execution block) of the NC program. Where the simulation indicates a need for modification of an execution block of the NC program and the block is modified, for example, the simulation can be performed again for the modified block and blocks subsequent thereto. Thus, the inventive NC machine simulation apparatus can check the modified NC program in a shorter time than the conventional NC machining simulation apparatus.

The NC machining simulation apparatus may further comprise a coordinate inputting device for inputting a coordinate position on a screen image displayed on the display device, and the image data generating section may be adapted to generate image data including pixel data updated from the pixel data generated at the end of each of the machining processes and process specification information specifying the corresponding machining process, and store the generated image data in the process image data storage section, wherein the image data generating section, upon detection of the coordinate position inputted from the coordinate inputting device, detects process specification information indicative of a machining process related to a pixel corresponding to the detected coordinate position in image data serving as the base of an image currently displayed on the display device, reads image data generated at the end of a machining process precedent to the detected machining process from the process image data storage section to cause the graphic section to display the tool configuration and the workpiece configuration on the display device on the basis of the read image data, and successively re-generates image data for the detected machining process and machining processes subsequent thereto to cause the graphic section to display the tool configuration and the workpiece configuration on the display device on the basis of the re-generated image data.

In the NC machining simulation apparatus, image data including pixel data updated from the pixel data generated at the end of each of the machining processes by the image data generating section and process specification information specifying the corresponding machining process is generated, and stored in the process image data storage section. More specifically, pixel data generated for the first machining process is stored along with information (process specification information) specifying the first machining process in the process image data storage section and, thereafter, the pixel data in the process image data storage section is replaced with pixel data updated by sequentially analyzing the NC program. For the pixel data updated from the pixel data generated at the end of the machining process, the process specification information is updated with process specification information specifying the machining process.

When a coordinate position of a particular workpiece portion to be machined in accordance with a modified machining process of the NC program is inputted on a screen image displayed on the display device by the coordinate inputting device, for example, the image data generating section detects the coordinate position, and detects process specification information related to a pixel corresponding to the coordinate position in image data serving as the base of the currently displayed image. Then, the image data generating section reads image data generated at the end of a machining process precedent to the detected machining process from the process image data storage section to cause the graphic section to display the tool configuration and the workpiece configuration on the display device on the basis of the read image data, and successively re-generates image data for the detected machining process and the machining processes subsequent thereto to cause the graphic section to display the tool configuration and the workpiece configuration on the display device on the basis of the generated image data.

With this arrangement, the NC machining simulation apparatus can restart the machining simulation from an intermediate machining process (execution block) of the NC program as in the aforesaid case. Where an execution block of the NC program is modified, the simulation for the modified block and blocks subsequent thereto can be started from the modified block. Therefore, the inventive NC machining simulation apparatus can check the modified NC program in a shorter time than the conventional NC machining simulation apparatus. Since the machining process to be subjected to the re-simulation can easily be designated on a screen image displayed on the display device, the re-simulation can rapidly be performed.

The NC machining simulation apparatus may further comprise a block image data storage section for storing therein the pixel data generated at the end of each of the execution blocks by the image data generating section for each of the execution blocks, and the image data generating section may be adapted to read pixel data for a precedent execution block from the block image data storage section upon reception of a back command externally inputted thereto, and cause the graphic section to display the tool configuration and the workpiece configuration on the display device on the basis of the read pixel data.

With this arrangement, the pixel data generated at the end of each of the execution blocks by the image data generating section is stored for each of the execution blocks in the block image data storage section. When the back command for displaying a screen image for a precedent execution block is externally inputted, the image data generating section reads pixel data for the precedent execution block from the block image data storage section upon reception of the back command, and causes the graphic section to display the tool configuration and the workpiece configuration on the display device on the basis of the read pixel data.

In the NC machining simulation apparatus, a tool image and a workpiece image for the precedent execution block can retrospectively be displayed on the display device by externally inputting the back command. Where a machining state simulated according to an intended execution block of the NC program cannot satisfactorily be checked during the simulation, the machining state can retrospectively be checked.

The pixel data herein termed is intended to include positional data, color data and the like for each pixel.

DESCRIPTION OF THE PREFERRED EMBODIMENT

Figure 1:
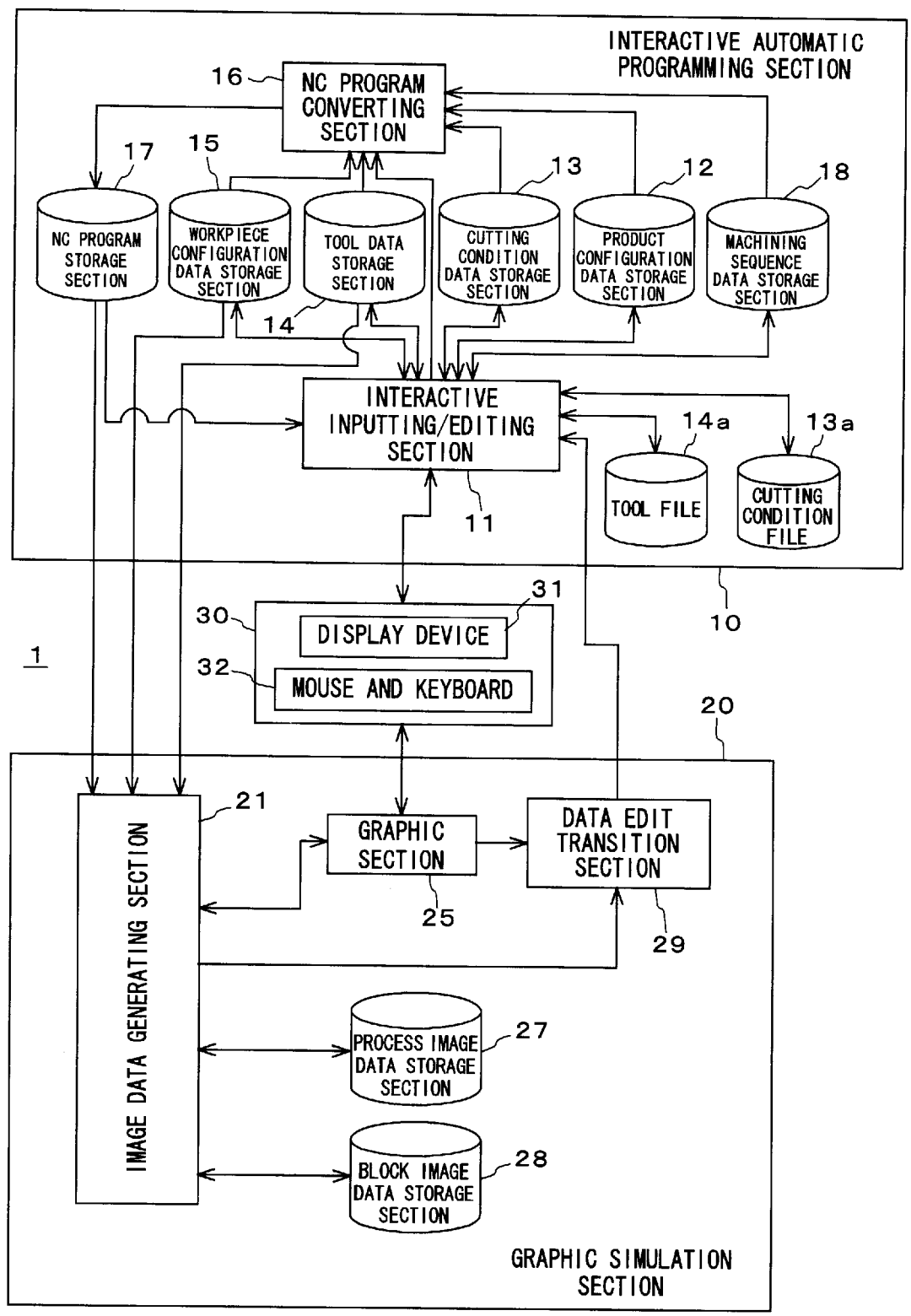
FIG. 1 is a block diagram schematically illustrating the construction of an automatic programming and simulation apparatus according to one embodiment of the present invention.

With reference to the attached drawings, the present invention will hereinafter be described by way of a specific embodiment thereof. FIG. 1 is a block diagram schematically illustrating the construction of an automatic programming and simulation apparatus according to the embodiment of the present invention.

As shown in FIG. 1, the inventive automatic programming and simulation apparatus 1 includes an interactive automatic programming section 10 and a graphic simulation section 20 which are constituted by a CPU and storage devices such as a ROM, a RAM and a hard disk, a display device 31 such as a CRT, and an inputting device 32 such as a mouse and a keyboard. The apparatus 1 further includes a peripheral device 30 for inputting a coordinate position on a screen image displayed on the display device 31. The respective components will be described below in detail.

A. Interactive Automatic Programming Section

The interactive automatic programming section 10 includes processing sections such as an interactive inputting/editing section 11 and an NC program converting section 16, and storage sections such as a product configuration data storage section 12, a cutting condition data storage section 13, a cutting condition file 13a, a tool data storage section 14, a tool file 14a, a workpiece configuration data storage section 15, an NC program storage section 17 and a machining sequence data storage section 18.

The interactive inputting/editing section 11 receives product configuration data including dimensional data of a product and workpiece configuration data including dimensional data of a workpiece interactively inputted from the display device 31 and the inputting device 32, and stores the product configuration data and the workpiece configuration data 14 thus received in the product configuration data storage section 12 and in the workpiece configuration data storage section 15, respectively. Tool data including dimensional data of tools is stored in the tool file 14a, and cutting condition data for each blank material and for each tool is stored in the cutting condition file 13a. The interactive inputting/editing section 11 allows for interactive edit (addition, modification and deletion) of data stored in the tool file 14a and the cutting condition file 13a by means of the display device 31 and the inputting device 32.

Further, the interactive inputting/editing section 11 automatically determines a tool to be used, cutting conditions and a machining sequence on the basis of the data stored in the product configuration data storage section 12, the workpiece configuration data storage section 15, the cutting condition file 13a and the tool file 14a, and stores the to-be-used tool data, the cutting condition data and the machining sequence data thus determined in the tool data storage section 14, in the cutting condition data storage section 13 and in the machining sequence data storage section 18, respectively. In this embodiment, a sequence of machining processes for machining respective workpiece portions is determined on the basis of the product configuration data, and sequence numbers (process numbers) are respectively assigned to the machining processes to be each performed with the use of a single tool. Then, the machining sequence data is generated, which indicates a correlation between each of the sequence numbers and the data of each of the workpiece portions to be machined. The data stored in the product configuration data storage section 12, the workpiece configuration data storage section 15, the tool data storage section 14, the cutting condition data storage section 13 and the machining sequence data storage section 18 will hereinafter be referred to collectively as "programming base data".

The interactive inputting/editing section 11 receives a program conversion enabling signal inputted from the inputting section 32, and transmits the received enabling signal to the NC program converting section 16.

Upon reception of the enabling signal from the interactive inputting/editing section 11, the NC program converting section 16 performs an automatic NC program creating operation. More specifically, the NC program converting section 16 automatically creates an NC program on the basis of the programming base data stored in the product configuration data storage section 12, the workpiece configuration data storage section 15, the tool data storage section 14, the cutting condition data storage section 13 and the machining sequence data storage section 18, and stores the created NC program in the NC program storage section 17.

Further, the interactive inputting/editing section 11 receives a sequence number indicative of a specific machining process from a data edit transition section 29 (to be described later), and retrieves programming base data from the product configuration data storage section 12, the workpiece configuration data storage section 15, the tool data storage section 14, the cutting condition data storage section 13 and the machining sequence data storage section 18 on the basis of the received sequence number, so that the retrieved programming base data can interactively be edited by means of the display device 31 and the inputting device 32. Upon completion of the editing operation, the data stored in the product configuration data storage section 12, the cutting condition data storage section 13, the tool data storage section 14 and the workpiece configuration data storage section 15 is updated with the edited data. When the data is thus edited, the NC program converting section 16 re-creates the NC program on the basis of the edited data.

B. Graphic Simulation Section

The graphic simulation section 20 includes processing sections such as an image data generating section 21, a graphic section 25 and the data edit transition section 29, and storage sections such as a process image data storage section 27 and a block image data storage section 28.

The image data generating section 21 reads the NC program from the NC program storage section 17 to successively analyze execution blocks of the NC program, and reads the tool configuration data and the workpiece configuration data for each of the execution blocks from the tool data storage section 14 and from the workpiece configuration data storage section 15, respectively, as required to successively generate pixel data indicative of the tool configuration and the workpiece configuration for each of the execution blocks on the basis of the read data and the results of the analysis. The pixel data includes positional data and color data for each pixel.

The image data generating section 21 generates image data including pixel data updated from the pixel data generated for each of the execution blocks and process specification information (sequence number) specifying a machining process to which the corresponding execution block belongs, and stores the generated image data in the process image data storage section 27. More specifically, pixel data generated in the first machining process of the NC program is stored along with a sequence number specifying the first machining process in the process image data storage section 27 and, thereafter, the pixel data in the process image data storage section 27 is replaced with pixel data updated by sequentially analyzing the NC program. For pixel data updated from the pixel data generated at the end of an execution block in a machining process, the sequence number is updated with a sequence number specifying the machining process, and image data thus generated at the end of the machining process is stored in the process image data storage section 27 as described above.

Figure 5:
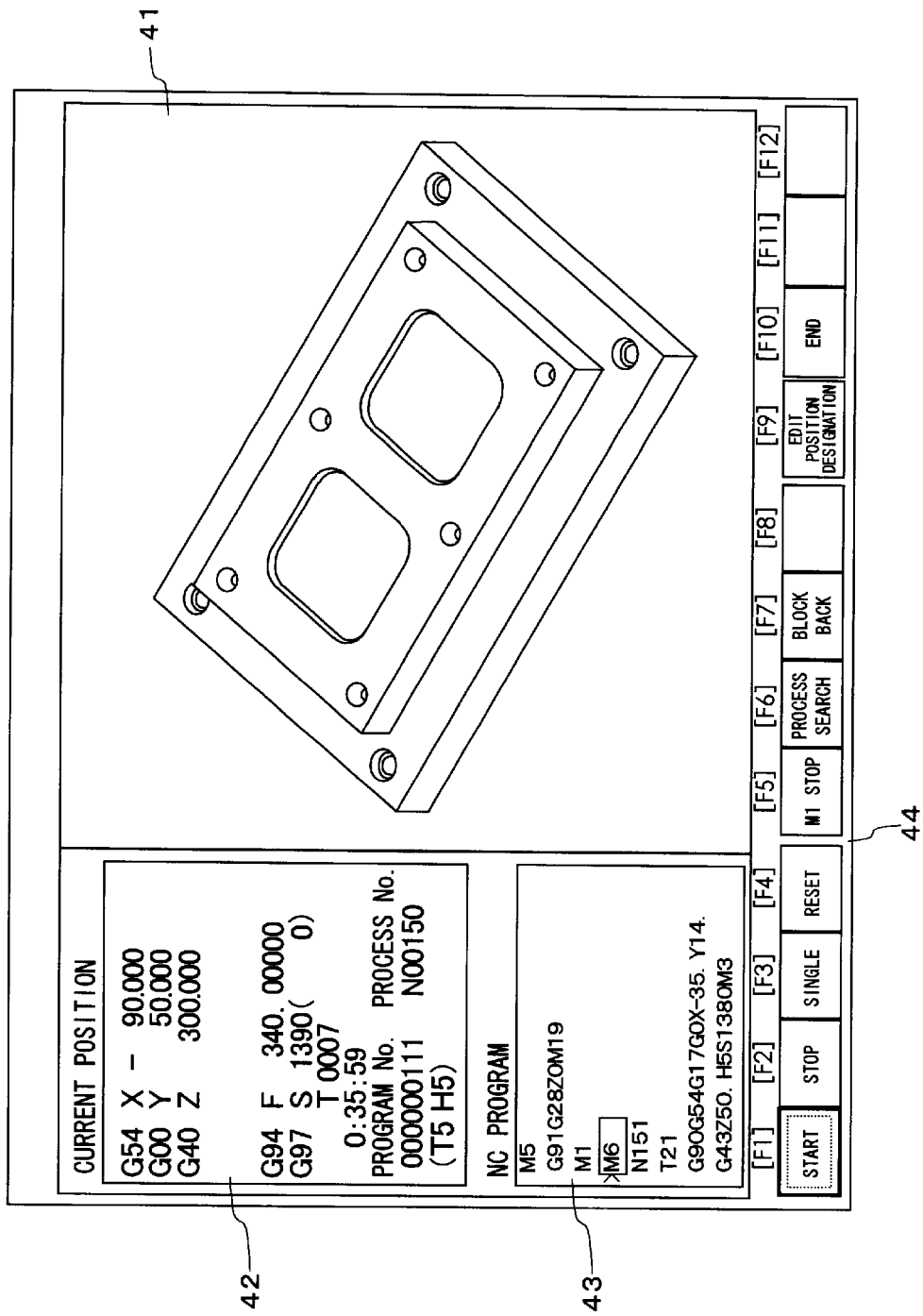
FIG. 5 is a diagram illustrating an exemplary screen image to be displayed on a display device in accordance with the embodiment.
Figure 6:
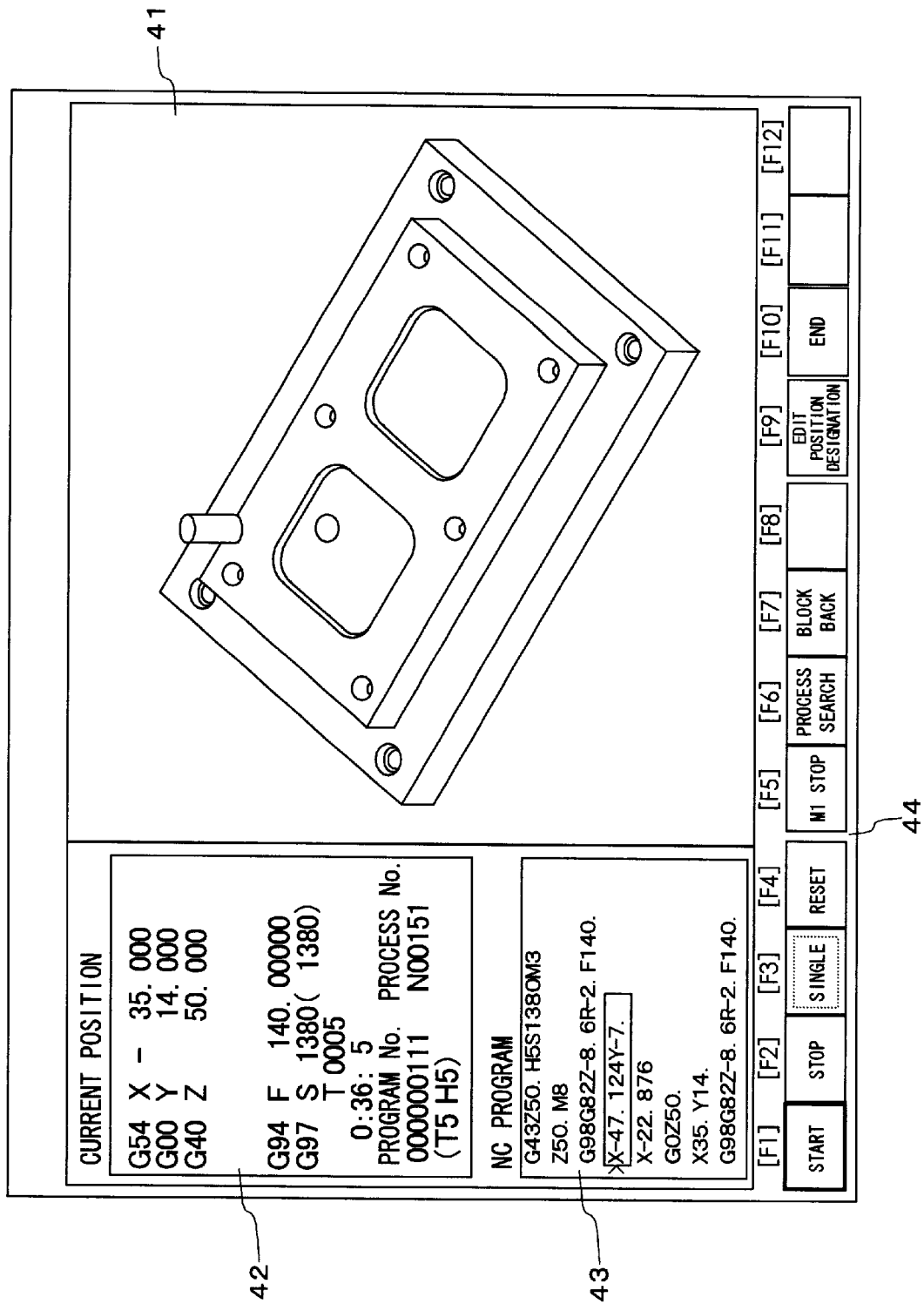
FIG. 6 is a diagram illustrating another exemplary screen image to be displayed on the display device in accordance with the embodiment.
Figure 7:
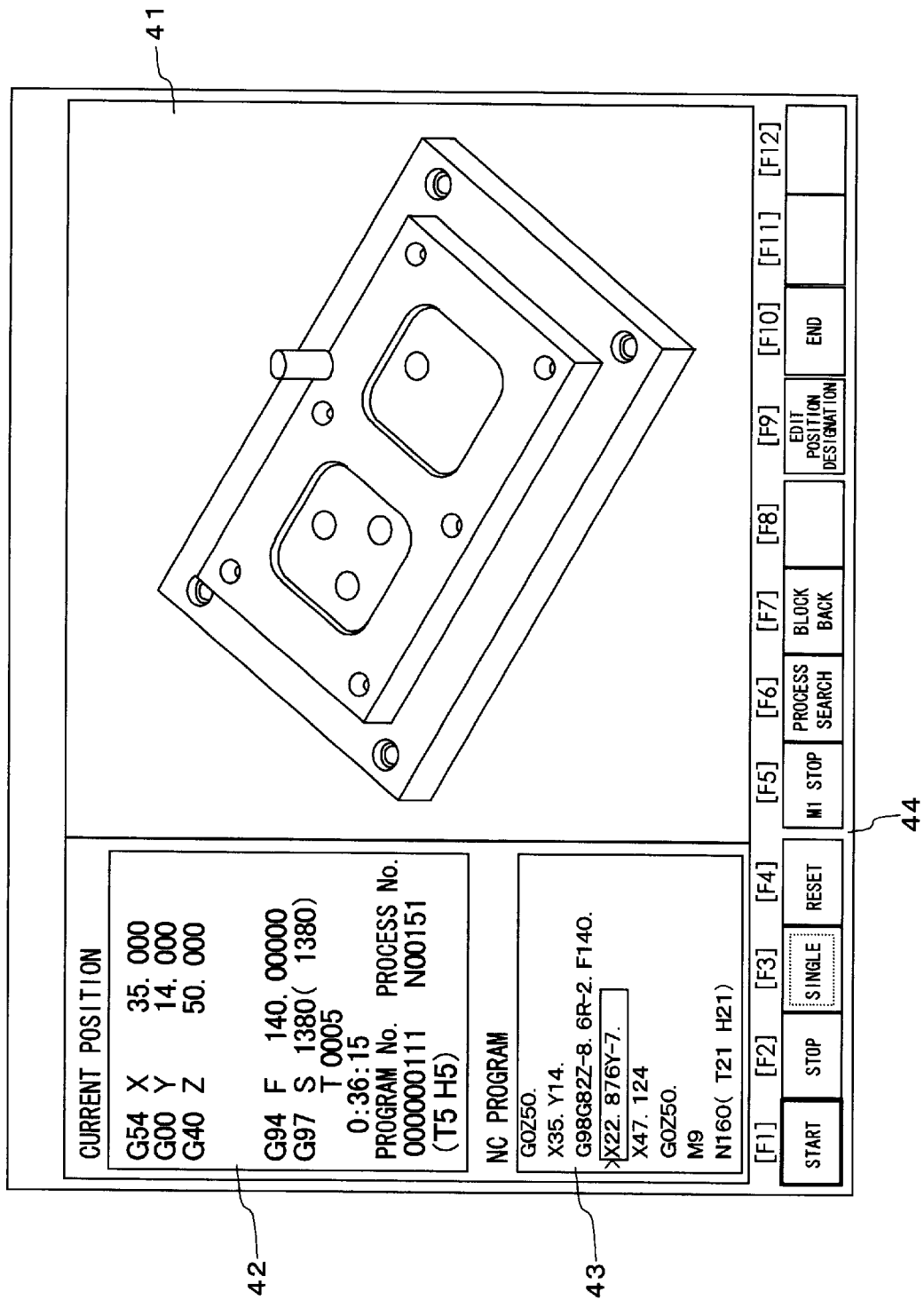
FIG. 7 is a diagram illustrating further another exemplary screen image to be displayed on the display device in accordance with the embodiment.

The pixel data thus generated is transmitted to the graphic section 25, which in turn displays a tool image and a workpiece image on the display device 31 on the basis of the pixel data. Exemplary simulation screen images to be displayed on the display device 31 are shown in FIGS. 5 to 7. In FIGS. 5 to 7, reference numerals 41, 42, 43 and 44 denote a region in which a simulation image is displayed, a region in which current parameters for a tool are displayed, a region in which the NC program is displayed, and a region in which soft keys are displayed, respectively. FIGS. 5 to 7 illustrate simulation images for a drilling process, which proceeds in the order shown in FIGS. 5 to 7.

Further, the image data generating section 21 receives a coordinate position inputted via the graphic section 25 by means of a coordinate inputting device constituted by the display device 31 and the inputting device 32, and detects a sequence number related to a pixel corresponding to the inputted coordinate position in image data serving as the base of a currently displayed image. The image data generating section 21 reads image data generated at the end of a machining process having a sequence number precedent to the detected sequence number from the process image data storage section 27 to cause the graphic section 25 to display the tool image and the workpiece image on the display device 31 on the basis of the read image data, and re-generates pixel data for the detected machining process and machining processes subsequent thereto to cause the graphic section 25 to display the tool image and the workpiece image on the display device 31 on the basis of the re-generated pixel data. In other words, the image data generating section 21 receives an input indicative of a specific coordinate position (machining position) on a screen image displayed on the display device 31, detects a machining process related to the machining position, and performs the simulation again for the detected machining process and machining processes subsequent thereto.

Further, the image data generating section 21 stores image data generated at the end of each of the execution blocks in the block image data storage section 28. The block image data storage section 28 is capable of storing image data for the latest several dozens of execution blocks. The image data generating section 21 receives a block back command inputted via the graphic section 25 from the display device 31 and the inputting device 32, and reads pixel data for a precedent execution block from the block image data storage section 28 to cause the graphic section 25 to display the tool image and the workpiece image for the precedent execution block on the display device 31 on the basis of the read pixel data. The block back operation may be performed repeatedly but not only once, so that all the pixel data stored for the latest execution blocks in the block image data storage section 28 can retrospectively be reviewed by the block back operation performed in response to the block back command.

The data edit transition section 29 receives a specific coordinate position (machining position) on a screen image displayed on the display device 31 and a command for jumping to an edit screen which are inputted via the graphic section 25 by means of the display device 31 and the inputting device 32, and obtains a sequence number related to a pixel corresponding to the inputted coordinate position (machining position) from the image data generating section 21 having image data serving as the base of the currently displayed screen image to transmit the sequence number to the interactive inputting/editing section 11.

When the sequence number is transmitted from the data edit transition section 29 to the interactive inputting/editing section 11, the interactive inputting/editing section 11 retrieves programming base data from the product configuration data storage section 12, the workpiece configuration data storage section 15, the tool data storage section 14, the cutting condition data storage section 13 and the machining sequence data storage section 18 on the basis of the received sequence number as described above, allowing for interactive editing of the retrieved programming base data through the display device 31 and the inputting device 32.

Figure 8:
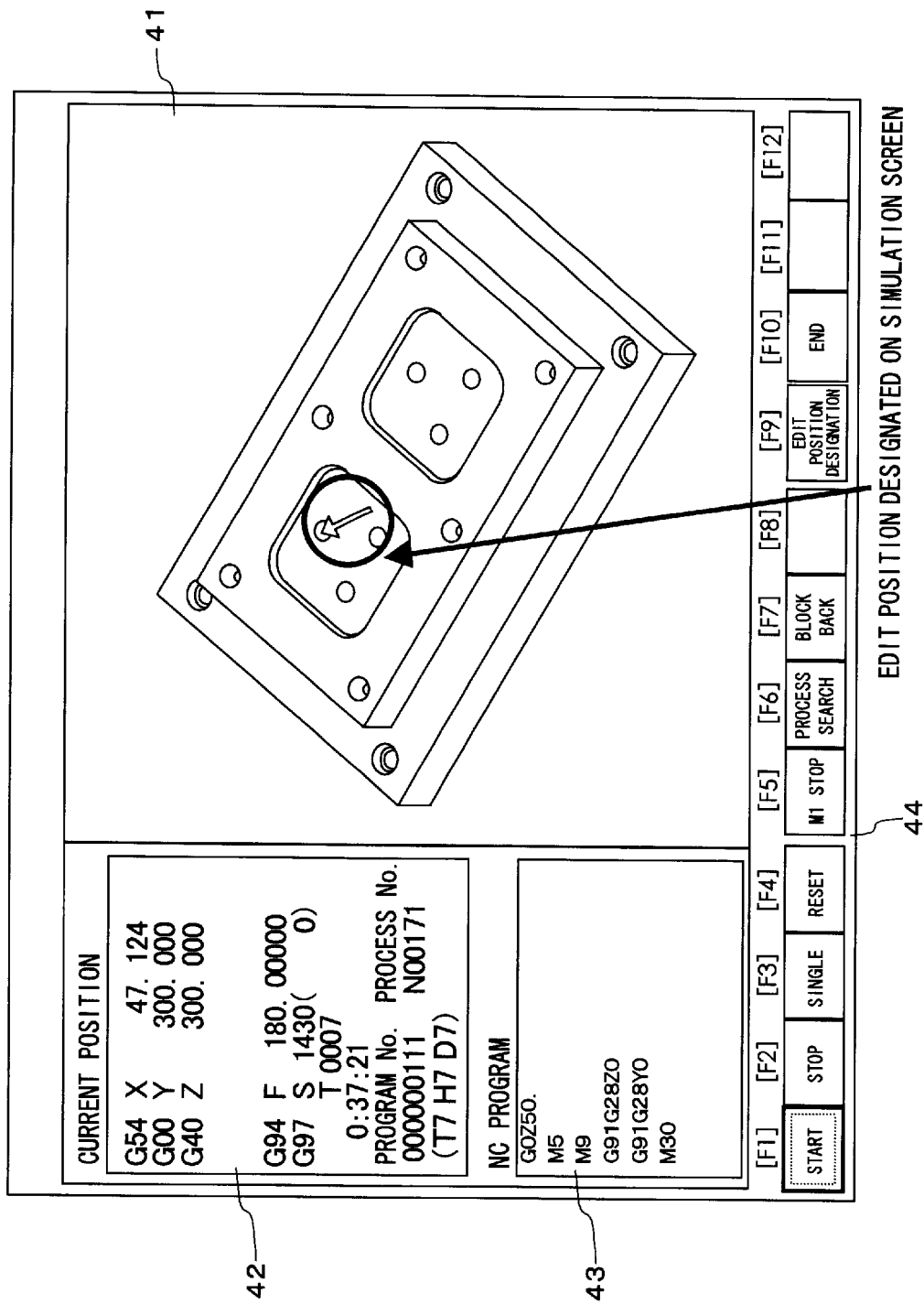
FIG. 8 is a diagram illustrating still another exemplary screen image to be displayed on the display device in accordance with the embodiment.
Figure 9:
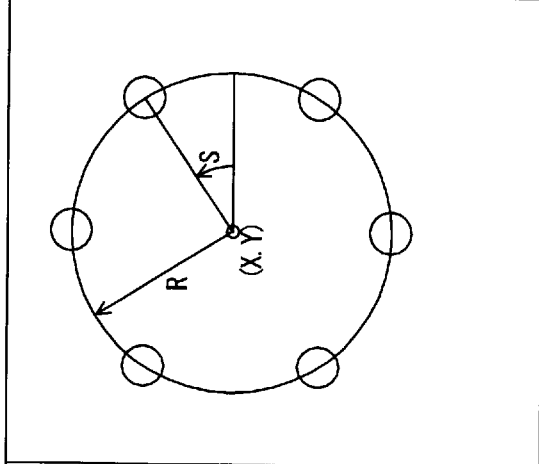
FIG. 9 is a diagram illustrating further another exemplary screen image to be displayed on the display device in accordance with the embodiment.

More specifically, a user turns on an "EDIT POSITION DESIGNATION" soft key on a screen image displayed on the display device 31, and then points a specific workpiece portion (a drilling position) to be modified with a mouse cursor and clicks on it to input a coordinate position as shown in FIG. 8. The coordinate position is inputted to the data edit transition section 29 via the graphic section 25. The data edit transition section 29 obtains a sequence number related to a pixel corresponding to the inputted coordinate position (machining position) from the image data generating section 21, and transmits the sequence number to the interactive inputting/editing section 11. The interactive inputting/editing section 11 performs the aforesaid operation to display an edit screen (a drilling process edit screen) as shown in FIG. 9 on the display device 31. Then, the pitch circle diameter and position of a hole, for example, are changed on the displayed edit screen.

Upon completion of the editing operation, the data stored in the product configuration data storage section 12, the cutting condition data storage section 13, the tool data storage section 14 and the workpiece configuration data storage section 15 is updated with the modified data. Then, the NC program converting section 16 re-creates the NC program on the basis of the edited data.

Figure 2:
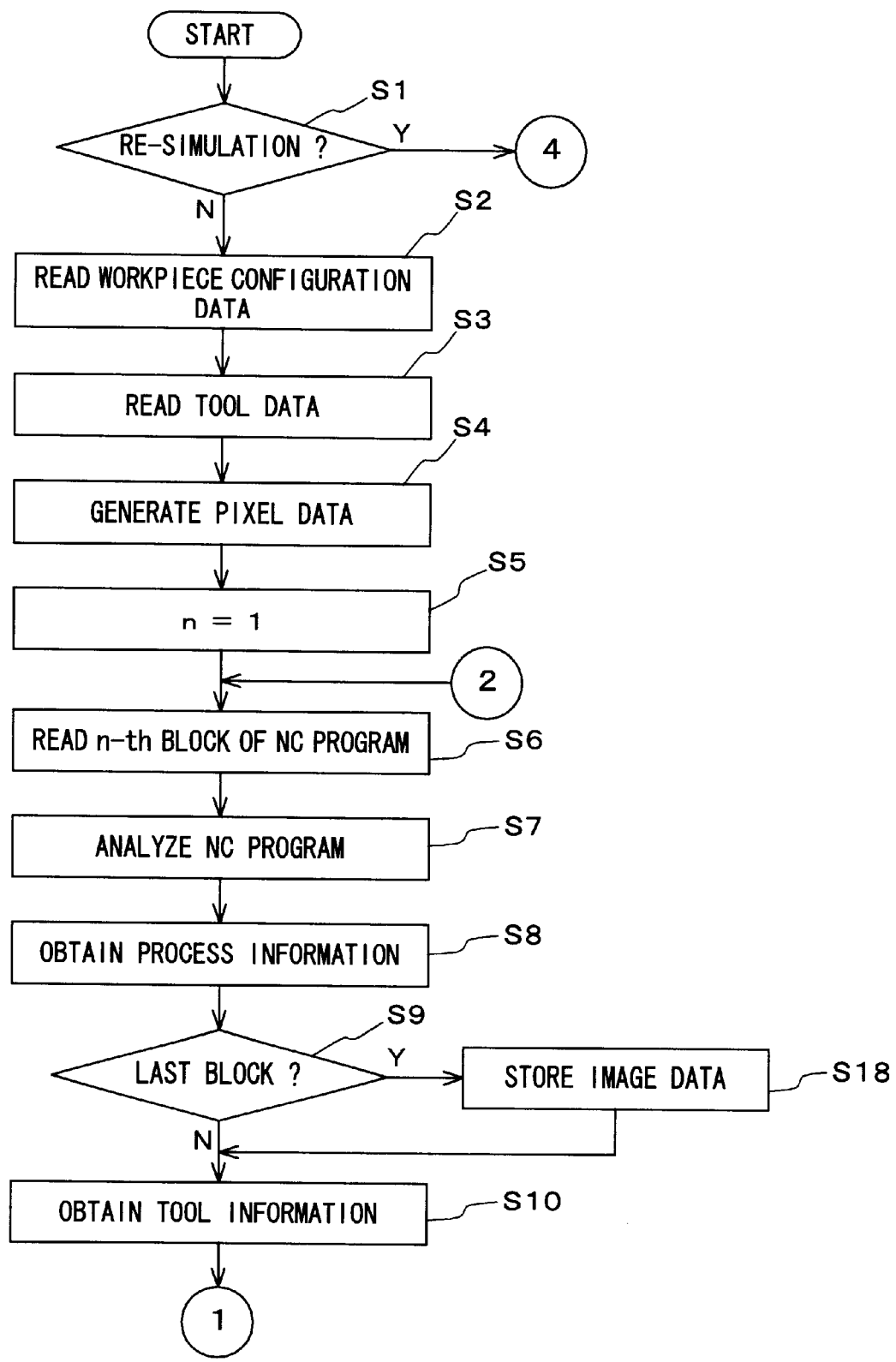
FIG. 2 is a flow chart for explaining a process to be performed by an image data generating section according to the embodiment.
Figure 3:
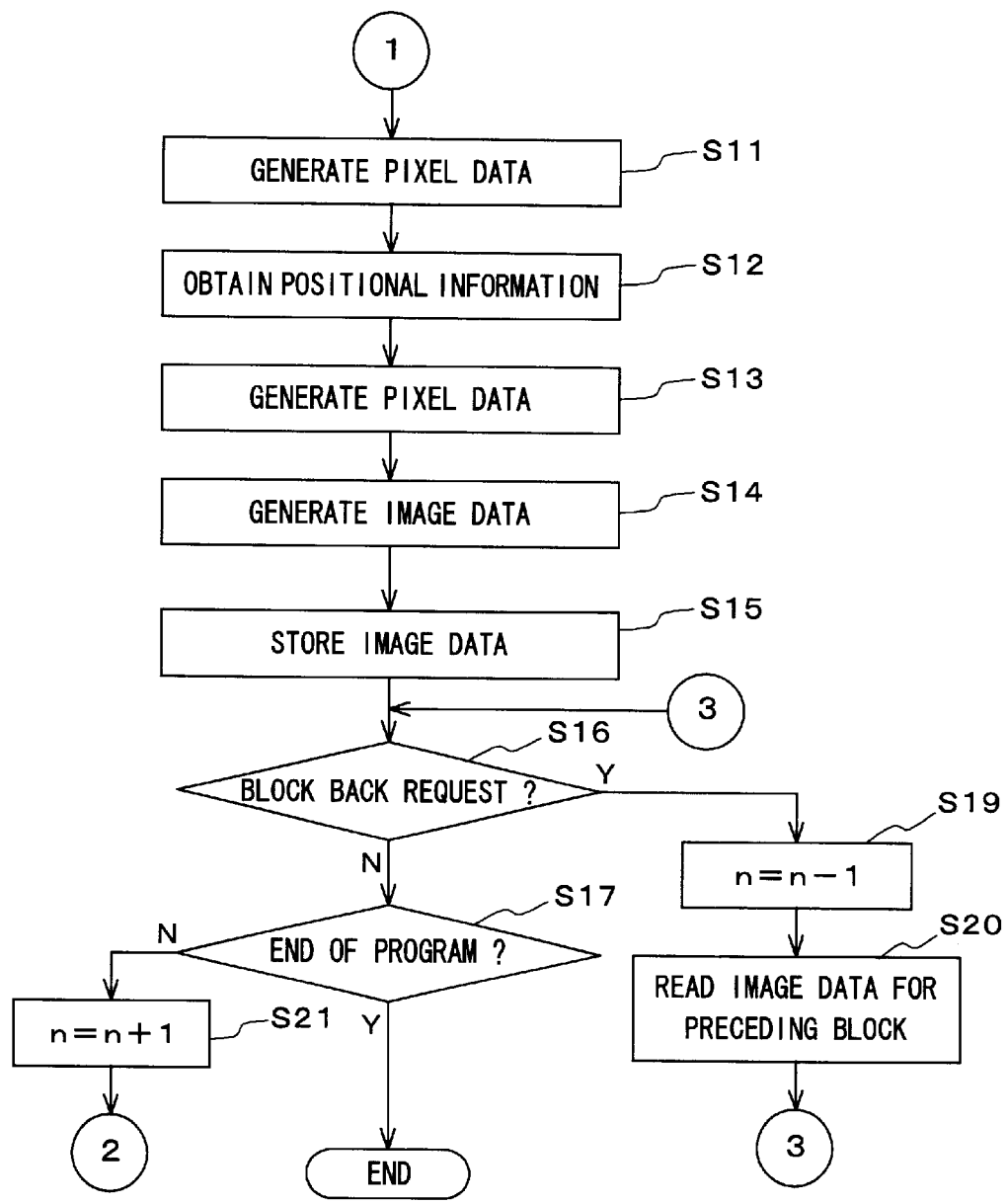
FIG. 3 is a flow chart for explaining the process to be performed by the image data generating section according to the embodiment.
Figure 4:
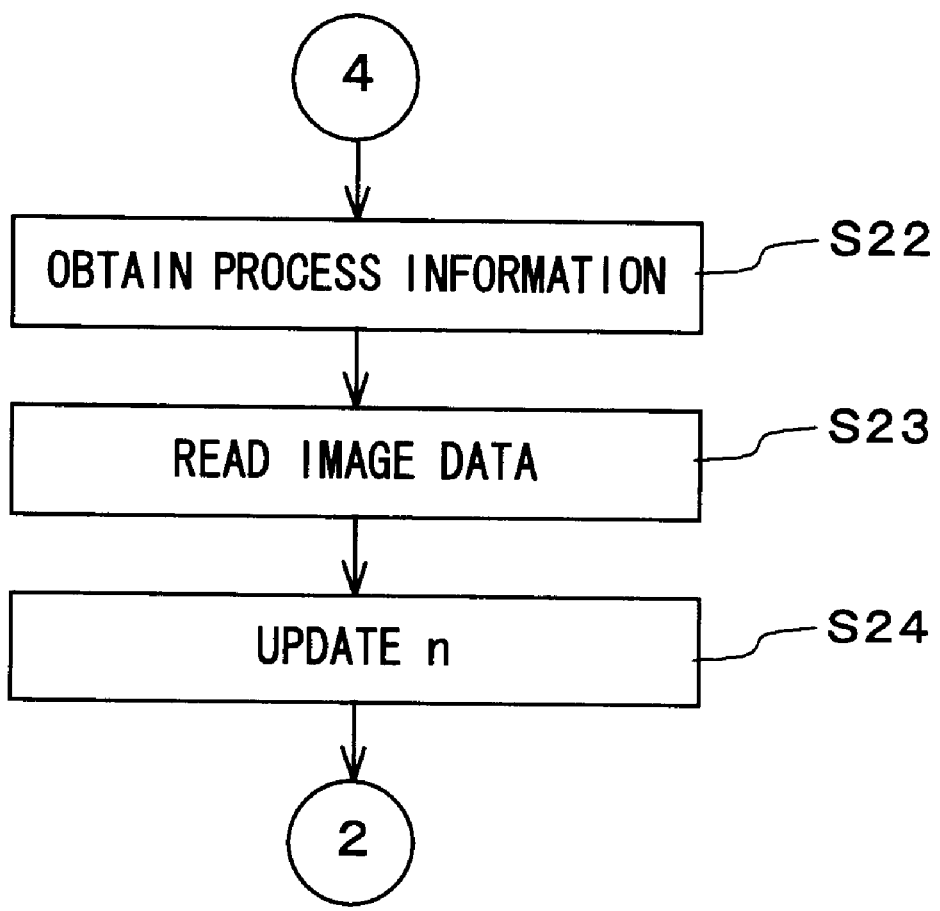
FIG. 4 is a flow chart for explaining the process to be performed by the image data generating section according to the embodiment.

With reference to FIGS. 2 to 4, an explanation will be given to the process to be performed by the image data generating section 21.

As shown in FIG. 2, the image data generating section 21 checks if a re-simulation request is inputted from the display device 31 and the inputting device 32 (Step S1). In the case of the first simulation, the process goes to Step S2. In the case of the re-simulation, the process goes to Step S22 in Routine ④ shown in FIG. 4.

For the first simulation, data of a workpiece configuration and the like is read out of the workpiece configuration data storage section 15 (Step S2), and data of a tool configuration and the like is read out of the tool data storage section 14 (Step S3). Then, pixel data for a workpiece image is generated on the basis of the workpiece configuration data (Step S4). The pixel data thus generated is transmitted to the graphic section 25, which in turn displays the workpiece image on the display device 31.

Subsequently, a counter n is set at 1 (Step S5), and an n-th execution block (n: a positive integer) of the NC program is read in (Step S6) and analyzed (Step S7). Then, process information (sequence number and the like) is obtained from the results of the analysis (Step S8), and it is judged on the basis of the process information whether or not the n-th block is the last block in the machining process (Step S9).

If it is judged in Step S9 that the n-th block is not the last block, information on a tool to be used in the block is obtained (Step 10). If it is judged that the n-th block is the last block, image data generated at the end of the block is stored in the process image data storage section 27 (Step S18), and then the process goes to Step S10.

Pixel data for a tool image is generated on the basis of the tool information thus obtained and the tool configuration data read in Step S3 (Step S11). The pixel data thus generated is transmitted to the graphic section 25, which in turn displays the tool image on the display device 31.

Information on a tool destination and a tool feed rate is obtained from the results of the analysis performed in Step S7, and the traveling positions of the tool at predetermined sampling time points are determined. Pixel data is generated which represents sequential movement of the tool to the tool traveling positions from a position indicated in the tool image obtained in Step S11 (Step S13). Where the tool configuration moves over the workpiece configuration, pixel data is generated which represents removal of an overlap between the tool configuration and the workpiece configuration. The pixel data thus generated is transmitted to the graphic section 25, which in turn displays images of the traveling tool and the workpiece cut by the tool on the display device 31.

Where the pixel data on the workpiece configuration includes pixel data updated in the execution block in Step S13, i.e., where there is pixel data updated to represent the removal of the overlap between the workpiece configuration and the tool configuration traveling over the workpiece configuration, image data including the updated pixel data and a sequence number of the machining process to which the block belongs is generated, and stored in the block image data storage section 28.

Next, it is checked if a block back request is inputted from the display device 31 and the inputting device 32 (Step S16). If there is no request, it is checked if the NC program ends (Step S17). If the NC program does not end, the counter n is incremented by one (Step S21), and then the process returns to Step S6 for repetition of the previous operation. If the NC program ends, the process ends. On the other hand, if there is the block back request in Step S16, the counter n is decremented by one (Step S19), and image data for a precedent block is read out of the block image data storage section 28 (Step S20). The read image data is transmitted to the graphic section 25, which in turn displays the tool image and the workpiece image on the display device 31 on the basis of the read image data. Then, the process goes to Step S16.

Where there is the re-simulation request in Step S1, the process goes to Step S22 in Routine ④ shown in FIG. 4. That is, a coordinate position is inputted from the coordinate inputting device constituted by the display device 31 and the inputting device 32, and a sequence number (process information) related to a pixel corresponding to the inputted coordinate position is detected in image data serving as the base of a screen image currently displayed on the display device 31 (Step S22). Image data generated at the end of a machining process having a sequence number precedent to the detected sequence number is read out of the process image data storage section 27 (Step S23). The read image data is transmitted to the graphic section 25, which in turn displays the tool image and the workpiece image on the display device 31 on the basis of the read image data. Then, the counter n is updated from the last block number in the machining process having the detected sequence number (Step S24), and the process goes to Step S6 for the re-simulation.

As described above in detail, the automatic programming and simulation apparatus 1 according to this embodiment can restart the machining simulation from an intermediate machining process (execution block) of the NC program. Where the simulation indicates a need for modification of an execution block of the NC program and the block is modified, for example, the simulation can be performed again for the modified block and blocks subsequent thereto. Therefore, the inventive apparatus can check the modified NC program in a shorter time than the conventional NC machining simulation apparatus. The machining process to be subjected to the re-simulation, i.e., a workpiece portion to be machined in accordance with to the modified block of the NC program, can easily be designated on an image screen displayed on the display device 31 for the re-simulation. Thus, the re-simulation can rapidly be performed.

By inputting a back command from the display device 31 and the inputting device 32, a screen image including a tool image and a workpiece image for a precedent block can retrospectively be displayed on the display device 31. Where a machining state simulated according to an intended block of the NC program cannot satisfactorily be checked during the simulation, the machining state can retrospectively be checked. Thus, the machining state can highly accurately be checked.

What is claimed is:

1. An NC machining simulation apparatus for simulating a machining operation in accordance with an NC program including consecutive machining processes each constituted by one or more execution blocks by displaying a configuration of a tool and a configuration of a workpiece on a display device and changing the tool configuration and the workpiece configuration on the display device in accordance with the NC program so as to check movement and machining state of the tool on the display device, the apparatus comprising:

a tool data storage section storing therein tool configuration data;

a workpiece configuration data storage section storing therein workpiece configuration data;

an NC program storage section storing therein the NC program;

an image data generating section which successively analyzes the respective execution blocks of the NC program and successively generates pixel data indicative of the tool configuration and the workpiece configuration for the respective execution blocks on the basis of the tool configuration data stored in the tool data storage section and the workpiece configuration data stored in the workpiece configuration data storage section;

a graphic section which displays the tool configuration and the workpiece configuration on the display device on the basis of the pixel data generated by the image data generating section; and a process image data storage section for storing therein pixel data generated at the end of each of the machining processes by the image data generating section;

wherein the image data generating section, in response to designation of a machining process externally inputted thereto, reads pixel data generated at the end of a machining process precedent to the designated machining process from the process image data storage section to cause the graphic section to display the tool configuration and the workpiece configuration on the display device on the basis of the read pixel data, and successively re-generates pixel data for the designated machining process and machining processes subsequent thereto to cause the graphic section to display the tool configuration and the workpiece configuration on the display device on the basis of the re-generated pixel data.

2. An NC machining simulation apparatus as set forth in claim 1, further comprising a coordinate inputting device for inputting a coordinate position on a screen image displayed on the display device, wherein the image data generating section, instead of performing said process, generates image data including pixel data updated from the pixel data generated at the end of each of the machining processes and process specification information specifying the corresponding machining process, and stores the generated image data in the process image data storage section, wherein the image data generating section, upon detection of the coordinate position inputted from the coordinate inputting device, detects process specification information indicative of a machining process related to a pixel corresponding to the detected coordinate position in image data serving as the base of an image currently displayed on the display device, reads image data generated at the end of a machining process precedent to the detected machining process from the process image data storage section to cause the graphic section to display the tool configuration and the workpiece configuration on the display device on the basis of the read image data, and successively regenerates image data for the detected machining process and machining processes subsequent thereto to cause the graphic section to display the tool configuration and the workpiece configuration on the display device on the basis of the re-generated image data.

3. An NC machining simulation apparatus as set forth in claim 1 or 2, further comprising a block image data storage section for storing therein the pixel data generated at the end of each of the execution blocks by the image data generating section for each of the execution blocks, wherein the image data generating section further reads pixel data for a precedent execution block from the block image data storage section upon reception of a back command externally inputted thereto, and causes the graphic section to display the tool configuration and the workpiece configuration on the display device on the basis of the read pixel data.

4. An NC machining simulation apparatus as set forth in claim 1, comprising, instead of the process image data storage section, a block image data storage section for storing therein the pixel data generated at the end of each of the execution blocks by the image data generating section for each of the execution blocks, wherein the image data generating section, instead of performing said process, reads pixel data for a precedent execution block from the block image data storage section upon reception of a back command externally inputted thereto, and causes the graphic section to display the tool configuration and the workpiece configuration on the display device on the basis of the read pixel data.

* * * * *